(12) United States Patent
Kwon et al.

(10) Patent No.: US 8,782,871 B2
(45) Date of Patent: Jul. 22, 2014

(54) MANUFACTURING METHOD OF LAUNDRY MACHINE

(75) Inventors: Ig Geun Kwon, Changwon-si (KR); Soo Bong Kim, Changwon-si (KR); Dong Il Lee, Changwon-si (KR); Suk Yun Moon, Changwon-si (KR); Hee Tae Kim, Changwon-si (KR); Jung Tae Song, Changwon-si (KR)

(73) Assignee: LG Electronics Inc., Seoul (KR)

( * ) Notice: Subject to any disclaimer, the term of this patent is extended or adjusted under 35 U.S.C. 154(b) by 44 days.

(21) Appl. No.: 13/320,701

(22) PCT Filed: May 28, 2010

(86) PCT No.: PCT/KR2010/003413
§ 371 (c)(1),
(2), (4) Date: Nov. 15, 2011

(87) PCT Pub. No.: WO2010/137916
PCT Pub. Date: Dec. 2, 2010

(65) Prior Publication Data
US 2012/0060350 A1    Mar. 15, 2012

(30) Foreign Application Priority Data

May 28, 2009    (KR) .................. 10-2009-0047192
Jun. 3, 2009    (KR) .................. 10-2009-0048987
Aug. 27, 2009    (KR) .................. 10-2009-0079930
May 18, 2010    (KR) .................. 10-2010-0046457

(51) Int. Cl.
*B21D 39/00*    (2006.01)
*D06F 35/00*    (2006.01)

(52) U.S. Cl.
USPC .................. 29/469; 68/23.1; 68/142

(58) Field of Classification Search
USPC ........ 29/469, 467; 68/23.1, 3 R, 24, 160, 142
See application file for complete search history.

(56) References Cited

U.S. PATENT DOCUMENTS 2,717,135 A * 9/1955 Douglas .................. 68/212
2,990,706 A * 7/1961 Bochan .................. 68/12.15
(Continued)

FOREIGN PATENT DOCUMENTS

CN    1296536 A    5/2001
CN    101046046 A    10/2007
(Continued)

OTHER PUBLICATIONS

International Search Report issued in PCT Application No. PCT/KR10/003413 dated Jan. 21, 2011.
(Continued)

*Primary Examiner* — Jermie Cozart
(74) *Attorney, Agent, or Firm* — Ked & Associates LLP

(57) ABSTRACT

A manufacturing method of a laundry machine is disclosed. The manufacturing method of the laundry machine includes a suspension preparing step configured to prepare a suspension unit (40) configured to flexibly support a drum (30), a tub rear securing step configured to secure a tub rear (120) to the suspension unit (40), a drum securing step configured to a shaft (351) or the drum (30) to the suspension unit (40) via an inside of the tub rear (120), a tub front coupling step configured to couple a tub front (100) to the tub rear (120), a tub seating step configured to seat the tub front (100) and the tub rear (120) in a cabinet cabinet base (600)*m* and a suspension securing step configured to secure the suspension unit to the cabinet base (600).

7 Claims, 9 Drawing Sheets

(56) References Cited

U.S. PATENT DOCUMENTS

| | | | | |
|---|---|---|---|---|
| 3,114,705 | A * | 12/1963 | Prihonic et al. | 210/145 |
| 3,172,278 | A * | 3/1965 | Burkland | 68/12.14 |
| 3,509,742 | A * | 5/1970 | Bauer | 68/23.1 |
| 4,991,412 | A * | 2/1991 | Bauer et al. | 68/23.1 |
| 5,080,204 | A * | 1/1992 | Bauer et al. | 188/129 |
| 5,230,229 | A * | 7/1993 | Stadelmann et al. | 68/23.1 |
| 5,907,880 | A * | 6/1999 | Durazzani et al. | 8/159 |
| 6,557,383 | B1 * | 5/2003 | Ito et al. | 68/23.2 |
| 7,568,366 | B2 * | 8/2009 | Chang et al. | 68/24 |
| 7,797,971 | B2 * | 9/2010 | Kawabata et al. | 68/140 |
| 7,841,220 | B2 * | 11/2010 | Lim et al. | 68/23.1 |
| 8,225,628 | B2 * | 7/2012 | Lim et al. | 68/23.1 |
| 8,387,421 | B2 * | 3/2013 | Chang | 68/24 |
| 8,434,334 | B2 * | 5/2013 | Chang et al. | 68/24 |
| 2003/0061842 | A1 * | 4/2003 | Ryu et al. | 68/17 R |
| 2004/0025544 | A1 * | 2/2004 | Kim et al. | 68/3 R |
| 2004/0031295 | A1 * | 2/2004 | Choi | 68/24 |
| 2004/0123631 | A1 * | 7/2004 | Chang | 68/23.1 |
| 2004/0129035 | A1 * | 7/2004 | Chang | 68/23 R |
| 2004/0163425 | A1 * | 8/2004 | Kim et al. | 68/23.1 |
| 2004/0163428 | A1 * | 8/2004 | Kim et al. | 68/140 |
| 2004/0237603 | A1 * | 12/2004 | Kim et al. | 68/15 |
| 2004/0244121 | A1 * | 12/2004 | Lim et al. | 8/159 |
| 2004/0244438 | A1 * | 12/2004 | North | 68/23.2 |
| 2005/0028564 | A1 * | 2/2005 | Lee et al. | 68/24 |
| 2005/0188472 | A1 * | 9/2005 | Park et al. | 8/158 |
| 2005/0274159 | A1 * | 12/2005 | Jeon et al. | 68/23.1 |
| 2006/0016228 | A1 * | 1/2006 | Chang et al. | 68/23.1 |
| 2006/0048405 | A1 * | 3/2006 | Baek et al. | 34/443 |
| 2006/0053838 | A1 * | 3/2006 | Inuzuka et al. | 68/3 R |
| 2006/0096328 | A1 * | 5/2006 | Na et al. | 68/3 R |
| 2006/0150687 | A1 * | 7/2006 | Chang et al. | 68/24 |
| 2006/0169006 | A1 * | 8/2006 | Lim et al. | 68/13 R |
| 2007/0017261 | A1 * | 1/2007 | Chang et al. | 68/23.1 |
| 2007/0089245 | A1 * | 4/2007 | Kim et al. | 8/158 |
| 2007/0101773 | A1 * | 5/2007 | Park et al. | 68/5 C |
| 2007/0137264 | A1 * | 6/2007 | Kawabata et al. | 68/140 |
| 2007/0157677 | A1 * | 7/2007 | Tatsumi et al. | 68/142 |
| 2007/0204659 | A1 * | 9/2007 | Yoon et al. | 68/23.1 |
| 2007/0227200 | A1 * | 10/2007 | Kim et al. | 68/140 |
| 2007/0283511 | A1 * | 12/2007 | Pelczer | 8/158 |
| 2007/0289339 | A1 * | 12/2007 | Lim | 68/23.1 |
| 2008/0263783 | A1 * | 10/2008 | Pyo | 8/149.3 |
| 2008/0264114 | A1 * | 10/2008 | Jang et al. | 68/139 |
| 2008/0282746 | A1 * | 11/2008 | Komori | 68/23.2 |
| 2008/0307833 | A1 * | 12/2008 | Chang et al. | 68/23.1 |
| 2009/0000340 | A1 * | 1/2009 | Lim et al. | 68/140 |
| 2009/0071200 | A1 * | 3/2009 | Chang | 68/140 |
| 2009/0121594 | A1 * | 5/2009 | Sans Rovira et al. | 312/228 |

FOREIGN PATENT DOCUMENTS

| | | |
|---|---|---|
| EP | 1 433 890 A2 | 6/2004 |
| EP | 1 433 891 A2 | 6/2004 |
| EP | 1 605 088 A2 | 12/2005 |
| EP | 1 079 014 B1 | 7/2006 |
| EP | 1 840 257 B1 | 8/2011 |
| JP | 2005-211694 | 8/2005 |
| JP | 2009-028400 | 2/2009 |
| JP | 4998130 B2 | 8/2012 |
| WO | WO 2008075198 A2 | 6/2008 |
| WO | WO 2008/103007 A2 | 8/2008 |

OTHER PUBLICATIONS

Chinese Office Action dated Apr. 3, 2013 issued in Application No. 201080022294.8 (with English translation).

European Search Report issued in Appln No. 10780827.1-1710 dated Mar. 12, 2014.

* cited by examiner

MANUFACTURING METHOD OF LAUNDRY MACHINE

TECHNICAL FIELD

The present invention relates to a manufacturing method of a laundry machine, more specifically, to a manufacturing method of a laundry machine which can improve a structure to improve washing efficiency.

BACKGROUND ART

Generally, laundry machines are electric appliances which remove various kinds of contaminants attached to clothes, beddings, cloth items and the like (hereinafter, laundry) by way of a friction force of water currents generated by rotation of a drum and a shock applied to laundry including clothes and the other items. A full-automatic laundry machine released in recent has a series of cycles including a washing, rinsing, dry-spinning cycle which are implemented automatically.

Instead of pulsator type laundry machine having a tub rotatable in a state of standing vertically, drum type laundry machines having little problems of entangled laundry and a lot of wrinkles generated in the laundry have been more and more popular recently.

As a structure of such a drum type laundry machine mentioned above is described schematically, the drum type laundry machine includes a cabinet configured to define an exterior appearance thereof, a tub located in the cabinet to receive wash water, with being supported by a damper an a spring, and a cylindrical drum located in the tub to receive laundry therein. The drum receives a driving force from a driving part to implement washing for the laundry loaded into the drum.

According to the structure of the drum type laundry machine mentioned above, the drum is rotated to wash and dry-spin the laundry loaded therein and it is vibrated because of the rotational force of the drum and eccentricity of the laundry. The vibration generated by the rotation of the drum may be transmitted outside via the tub and the cabinet.

Because of that, a spring and a damper are provided essentially between the tub and the cabinet to prevent the vibration transmitted to the tub from transmitted to the cabinet.

The drum type laundry machine mentioned above may be installed in an existing installation circumstance, for example, in a sink or built-in circumstance, not installed separately. As a result, the size of the drum type laundry machine may be installed limited to be adjustable to its installation circumstance.

As mentioned above, it is limited for the structure of the spring and damper dampening the vibration of the tub and the cabinet to change an inner structure of the drum type laundry. As the installation circumstance of the laundry machine is limited, it is limited to change the size of the laundry machine.

A lot of researches and developments have been in progress to improve washing capacities of laundry machines for user convenience and the increased washed laundry amount. However, it is difficult to enlarge the size of the tub in the conventional drum type laundry machine to increase the washing capacity, because of the limitation condition mentioned above.

As a result, laundry machines having various types of structures have been under development to improve the washing capacity as mentioned above.

DISCLOSURE OF INVENTION

Technical Problem

To solve the problems, an object of the present invention is to provide a manufacturing method of a drum type laundry machine having a new structure, different from the conventional laundry machine, specifically, a drum type laundry machine having a new suspendingly support structure, without transmitting vibration of a drum to a tub, different from the conventional laundry machine.

Solution to Problem

To achieve these objects and other advantages and in accordance with the purpose of the invention, as embodied and broadly described herein, a manufacturing method of a laundry machine includes a suspension preparing step configured to prepare a suspension unit configured to flexibly support a drum; a tub rear securing step configured to secure a tub rear to the suspension unit; a drum securing step configured to secure a shaft of the drum to the suspension unit via an inside of the tub rear; a tub front coupling step configured to couple a tub front to the tub rear; a tub seating step configured to seat the tub front and the tub rear in a cabinet base; and a suspension securing step configured to secure the suspension unit to the cabinet base.

The suspension unit preparing step may include steps of: preparing a bearing housing to support the shaft; securing a radial bracket to the bearing housing; and connecting a suspension bracket to the radial bracket.

The radial bracket and the suspension bracket may be symmetrical with respect to the bearing housing.

The suspension unit securing step may include steps of: installing a perpendicular spring cylinder damper to a front portion of the suspension bracket; and installing a forward/backward-oblique cylinder damper to a rear portion of the suspension bracket.

The spring cylinder damper and the cylinder damper may be secured to the suspension bracket in a side direction.

The suspension unit securing step may further include a step of: installing a spring cylinder damper between a lower part of the bearing housing and the cabinet base.

The spring cylinder damper may be connected to the bearing housing from a backward direction toward a forward direction.

The tub rear coupling step may include steps of: coupling a tub back to the bearing housing; coupling a rear gasket to the tub back; and coupling the tub rear to the rear gasket.

The manufacturing method may further include a step of assembling a drum by securing a drum front, a drum center and a drum rear to each other, prior to the drum securing step.

The suspension unit preparing step may include a step of securing a stator to the suspension unit and the drum securing step may include a step of securing a rotor to the shaft.

The manufacturing method may further include a step of installing a supporter front and a supporter rear to the cabinet base, prior to the tub seating step.

The tub seating stem may include a step of seating the tub front and the tub rear in the supporter front and the supporter rear.

The manufacturing method may further include a step of securing a cabinet rear to the tub rear, after the suspension unit securing step.

The manufacturing method may further include a step of installing a cabinet left and a cabinet right close to the tub rear and the tub front, after the suspension unit securing step.

The manufacturing method may further include a step of securing a cabinet front to the tub front, after the suspension unit securing step.

Each of the tub front and the drum may include an opening formed in a front part thereof to load laundry therein. The tub front and the tub rear may be supported more rigidly with respect to vibration generated in the drum than the drum is supported.

In another aspect of the present invention, a manufacturing method of a laundry machine includes steps of: installing a tub, a drum and a suspension unit configured to suspend vibration of the drum to a cabinet base; assembling a cabinet left, a cabinet right and a cabinet rear to the cabinet base, in a state of the tub, the drum and the suspension unit being installed to the cabinet base.

The tub and the drum may be installed to the cabinet base in a state of suspensions composing the suspension unit being installed to the base, in the step of installing the tub, the drum and the suspension unit.

The tub and the drum may be installed to the cabinet base in a state of the tub, the drum, the shaft, the bearing housing and the brackets of the suspension unit being assembled, in the step of installing the tub and the drum and the suspension unit.

The tub may be installed to independently stand on the base in the step of the tub and the drum and the suspension unit to the cabinet.

In a further aspect of the present invention, a manufacturing method of a laundry machine includes steps of: installing suspensions to a cabinet base; connecting a drum, a shaft, a bearing housing and brackets of a suspension unit with each other; and connecting the connected configuration to suspensions installed to the cabinet base.

In a still further aspect of the present invention, a manufacturing method of a laundry machine includes steps of: connecting a drum with a shaft; connecting the shaft to a bearing housing; and connecting the bearing housing with a suspension unit to enable the drum to independently stand on the base.

The manufacturing method may further include a step of installing a tub on the base to independently stand.

The drum and the tub may be installed on the base together.

The tub may be supported more rigidly than the drum is supported by the suspension unit. The suspension unit may include a supporting bracket extended toward a front part of the suspension unit in parallel to the shaft and a cylinder damper configured to support the supporting bracket. The tub may further include an opening formed in a front part thereof to load laundry therein and a door configured to open and close the opening.

In the meanwhile, according to the laundry machine, the tub may be fixedly installed or supported by a flexible structure such as the suspension unit. Or the supporting of the tub may be in the middle of the suspension supporting and the fixed supporting.

That is, the tub may be supported flexibly by using the suspension unit which will be described in detail in the description of the invention, or it may be supported more rigidly than the flexible supporting. For example, the tub may be supported by the suspension unit or a rubber bushing which can give a predetermined flexible motion to the tub, less flexible than the support by way of the suspension unit. Or the tub may be fixedly installed.

Examples of tubs supported more rigidly than the supporting of the suspension unit will be followed.

First of all, a predetermined portion of the tub may be integrally formed with the cabinet.

Second, the tub may be connected and supported by a screw, rivet, rubber bushing and the like or fixedly welded, adhered or sealed. In this case, the rigidity of the suspension unit is stronger than the rigidity of these connecting materials with respect to a vertical direction which is a main vibration direction of the drum.

Such the tub may be enlarged in a possible limited installation space. That is, the tub may be enlarged to be adjacent to a wall or frame, which limits the horizontal size of the installation space, with respect to at least a right and left direction orthogonal to a shaft direction if the shaft is horizontally installed. Here, the tub may be integrally formed with a right or left wall of the cabinet.

The tub may be closer to the wall or frame than to the drum in the right and left direction. For example, the tub may be 1.5 times or less as distant from the wall or frame by as from the drum. In the state of the tub enlarged in the right and left direction, the drum may be also enlarged in the right and left direction. As the right and left direction distance is getting smaller between the tub and the drum, the drum may be enlarged in the right and left direction as much. The right and left direction vibration of the drum may be put into consideration to reduce the right and left direction distance between the tub and the drum. As the right and left direction vibration of the drum is getting smaller, the diameter of the drum may be enlarged more. As a result, the right and left direction rigidity of the suspension unit configured to suspend the vibration of the drum may be larger than the other direction rigidity. For example, the rigidity of the suspension unit with respect to right and left direction displacement may be the maximum with respect to the other direction rigidity.

Furthermore, the suspension unit may be directly connected with the bearing housing configured to support the shaft connected with the shaft, different from the suspension unit connected via the tub according to the conventional laundry machine. That is, the bearing housing may include a supporting part configured to support the shaft and an extending part extended from the supporting part. The suspension unit may be coupled to the supporting part or the extending part of the bearing housing.

At this time, the suspension unit may include a bracket extended with respect to the shaft direction and the bracket may be extended forward to the door.

The suspension unit may include at least two suspensions distant from each other in the shaft direction.

The suspension unit may include a plurality of suspensions installed below the shaft to standing-support a supporting object, for example, the drum. The suspension unit may include a plurality of suspensions installed beyond the shaft to hang the supporting object thereto. According to these cases, suspensions are provided only below or beyond the shaft.

The gravity center of the vibration system including the drum, shaft, bearing housing and motor may be located in at least predetermined portion adjacent to the motor with respect to a longitudinal shape of the drum.

At least one suspension may be in front or rear of the gravity center or suspensions may be installed in front and rear of the gravity center, respectively.

The tub may include an opening formed in a rear part thereof. A driving part including the shaft, bearing housing and motor may be connected with the tub via a flexible material. The flexible material seals the opening formed in the rear part of the tub to prevent wash water from flowing out of the tub via the opening and to enable the driving part to relative-move with respect to the tub. Such the flexible material may be any flexible material which can seal, for example, gasket material such as front gasket. In this case, the flexible material may be named as rear gasket corresponding to the front gasket. The connection of the rear gasket with the driving part may be implemented in a rotational constrained state with respect to the rotational direction of the shaft. According to an embodiment, the rear gasket may be directly connected with the shaft or it may be connected with the extending part of the bearing housing.

A predetermined portion of the driving part which is located in a front connection with the rear gasket only to be exposed to wash water may be made of anticorrosive material. For example, the portion may be coated or covered with an auxiliary plastic-made part, for example, a tub back which will be described in detail. If there is a metal-made portion of the driving part, the metal-made portion may not be exposed to water directly and corrosion may be prevented accordingly.

Here, the cabinet may not be provided, different from the embodiment of the present invention. For example, a built-in laundry machine may be provided in a wall, instead of the cabinet. That is, the laundry machine may be fabricated without the cabinet configured to define the exterior appearance of the laundry machine. Even in this case, the front part of the cabinet may be formed.

Advantageous Effects of Invention

The present invention has following an advantageous effect.

According to the laundry machine of the present invention, a drum type laundry machine having a totally different new structure is provided. As a result, the vibration of the drum is not transmitted to the tub and it may be suspendingly supported.

Furthermore, according to the laundry machine of the present invention, the structure is changed to increase a washing capacity and the load of the tub having the increased capacity is supported vertically. As a result, stability of the tub supporting structure may be improved advantageously.

BRIEF DESCRIPTION OF DRAWINGS

The accompanying drawings, which are included to provide further understanding of the disclosure and are incorporated in and constitute a part of this application, illustrate embodiments of the disclosure and together with the description serve to explain the principle of the disclosure.

In the drawings.

BEST MODE FOR CARRYING OUT THE INVENTION

Reference will now be made in detail to the specific embodiments of the present invention, examples of which are illustrated in the accompanying drawings. Wherever possible, the same reference numbers will be used throughout the drawings to refer to the same or like parts.

Figure 1:
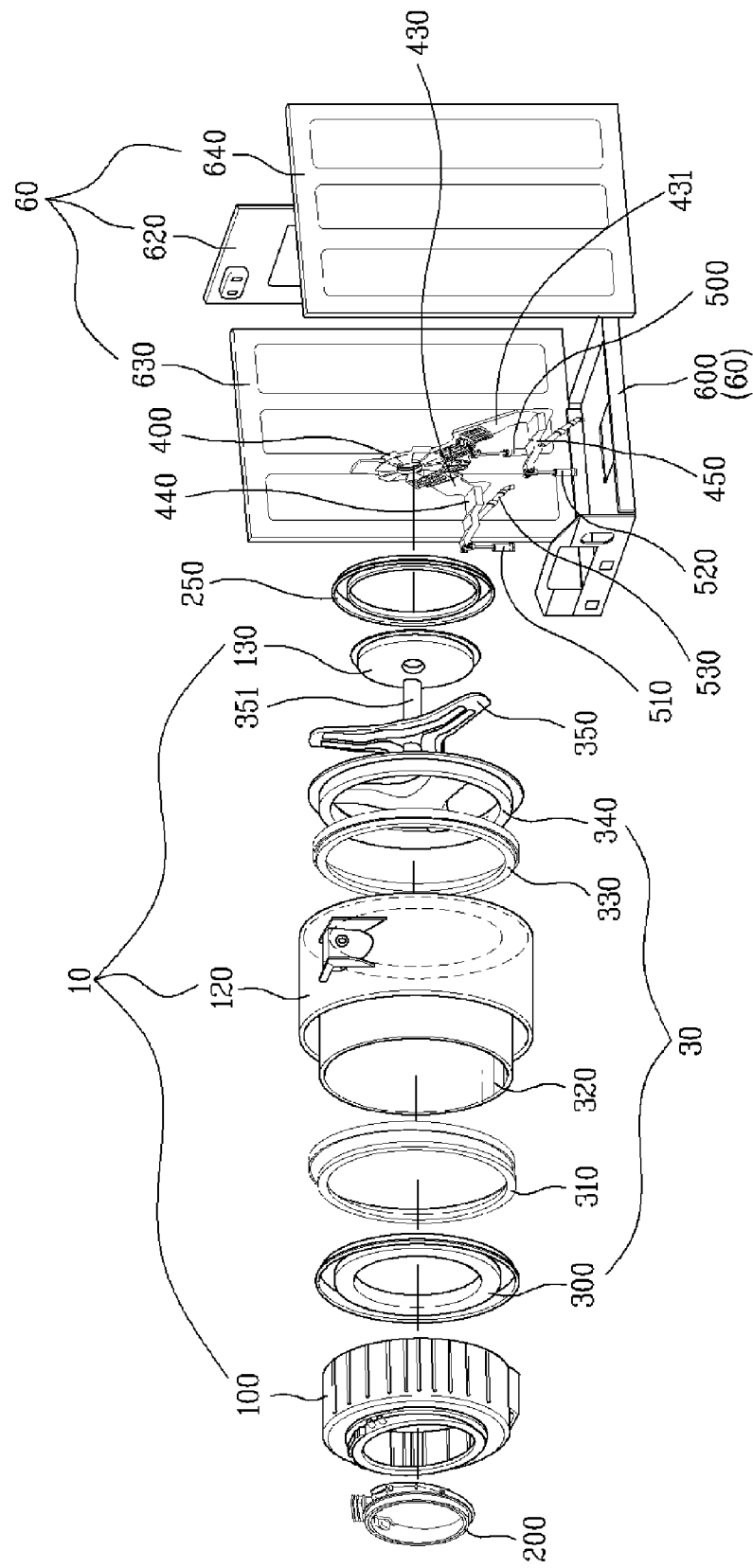
FIG. 1 an exploded perspective view illustrating a laundry machine according to an exemplary embodiment of the present invention.

FIG. 1 is an exploded perspective view illustrating a laundry machine according to an exemplary embodiment of the present invention.

As shown in FIG. 1, the laundry machine includes a tub fixedly installed in a cabinet 60. The tub 10 includes a tub front 100 configured to define a front of the tub 10 and a tub rear 120 configured to define a rear of the tub 10. The tub front 100 and the tub rear 120 are assembled by screws and a predetermined space is formed in the assembled tub front and tub rear 120 to accommodate a drum 30. The tub 10 may further include a tub back configured to form a rear surface of the tub 10 and the tub back is connected with the tub rear 120 via a rear gasket 250. The rear gasket 250 may be made of flexible material not to transmit the vibration of the tub back 130 to the tub rear 120.

The cabinet defines an exterior appearance of the laundry machine and it includes a cabinet front (not shown), a cabinet rear 620, a cabinet left 640, a cabinet right 630, a cabinet top (not shown) and a cabinet base 600.

The tub rear 120 has a rear surface 128 and the rear surface 128 of the tub rear 120, the tub back 130 and the rear gasket 250 forms a rear surface of the tub 10. The rear gasket 250 is sealed and connected with both of the tub back 130 and the tub rear 120, such that wash water inside the tub 10 may not leak. The tub back 130 is rotated together with the drum 30 when the drum 30 is rotated. At this time, the tub back 130 is distant from the tub rear 120 a predetermined distance not to interfere with the tub rear 120. Since the rear gasket 250 is made of flexible material, the tub back 130 is relative-moved, not interfering with the tub rear 120. The rear gasket 250 may include a corrugated part (252, see FIG. 4) extendible enough to enable this relative-motion.

A foreign substance preventing material 200 is provided in a front part of the tub front 100 to prevent foreign substances from coming between the tub 10 and the drum 30. The foreign substance preventing material 200 is flexible material and it is fixedly installed to the tub front 100. Here, the foreign substance preventing material 200 may be made of a predetermined material identical to the material of rear gasket 250.

The drum 30 is configured of a drum front 300, a drum center 320 and a drum back 340. Ball balancers may be installed in front and rear parts of the drum 30, respectively. The drum back 340 is connected with a spider 350 and the spider 350 is connected with a shaft 351. The drum 30 is rotated in the tub 10 by a rotational force transmitted via the shaft 351.

The shaft 351 is directly connected with a motor, passing through the tub back 130. Specifically, a rotor (not shown) of the motor is directly connected with the shaft 351. A bearing housing 400 is coupled to the rear surface 128 of the tub back 130 and the bearing housing 400 rotatably supports the shaft 351, located between the motor and the tub back 130.

A stator is fixedly installed in the bearing housing 400 and the rotor is located around the stator. As mentioned above, the rotor is directly connected with the shaft 351. Here, the motor may be an outer rotor type motor connected with the shaft 351 directly.

A suspension unit (40, see FIG. 5) located from the cabinet base 600 to support the bearing housing 400. The suspension unit 40 includes three spring cylinder dampers 500, 510, and 520 and two cylinder dampers 530 and 540 configured to obliquely support the bearing housing 400 in a forward and backward direction. The suspension unit 40 is connected to the cabinet base 600 flexibly to allow the drum 30 to move in forward/backward and rightward/leftward directions, not completely fixed to the cabinet base 600.

That is, the suspension unit 40 is flexible enough to allow the predetermined forward/backward and rightward/leftward rotation of the drum 30 with respect to the supporting point of the suspension unit connected with the cabinet base 600. Perpendicular suspensions may be installed in the cabinet base 600 in the media of a rubber bushing (not shown). Perpendicular ones of the suspensions are used to suspend the vibration of the drum 30 elastically and oblique ones of them are used to dampen the vibration of the drum 30. That is, the perpendicular one is employed as spring out of a vibration system including a spring and damping means and the oblique ones as damping means.

The other parts of the tub 10 may be fixedly installed to the cabinet, except the tub back 130 and the vibration of the drum 30 is suspended and supported by the suspension unit. Substantially, each of the tub 10 and the drum 30 has a separate supporting structure. Even if the drum 30 is vibrated, the tub 10 may not be vibrated.

As follows, each element will be described in detail.

Figure 2:
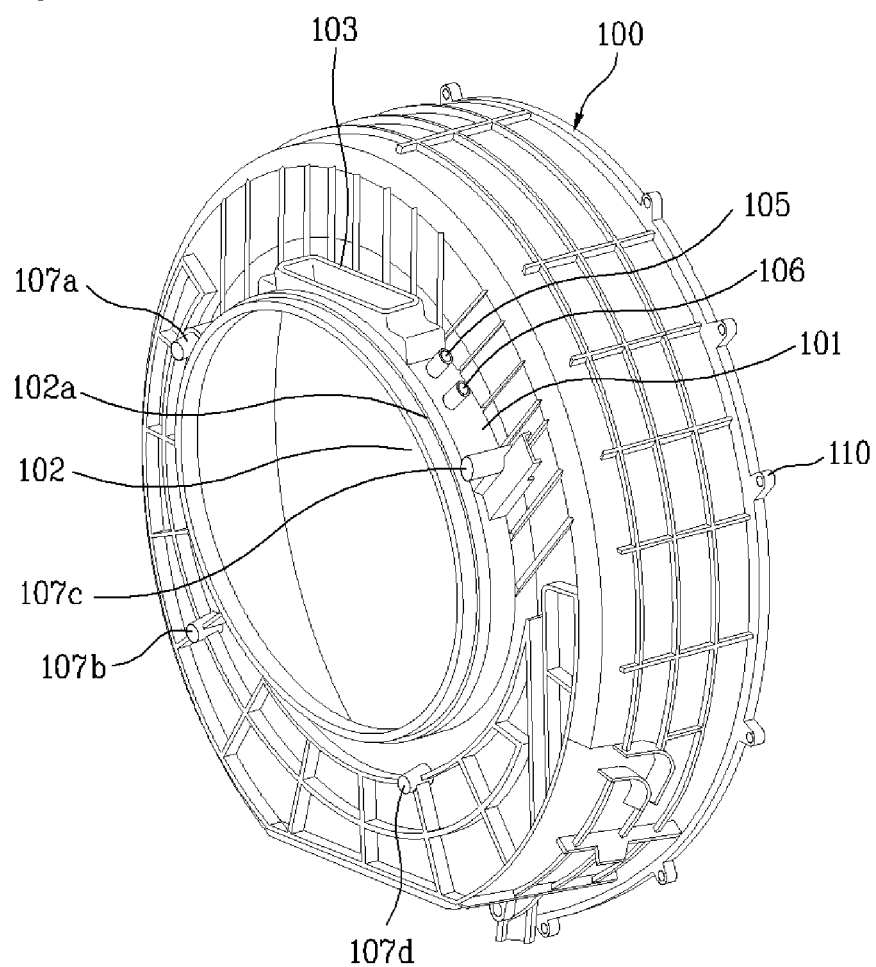
FIGS. 2 and 3 are perspective view illustrating a tub front of the laundry machine.
Figure 3:
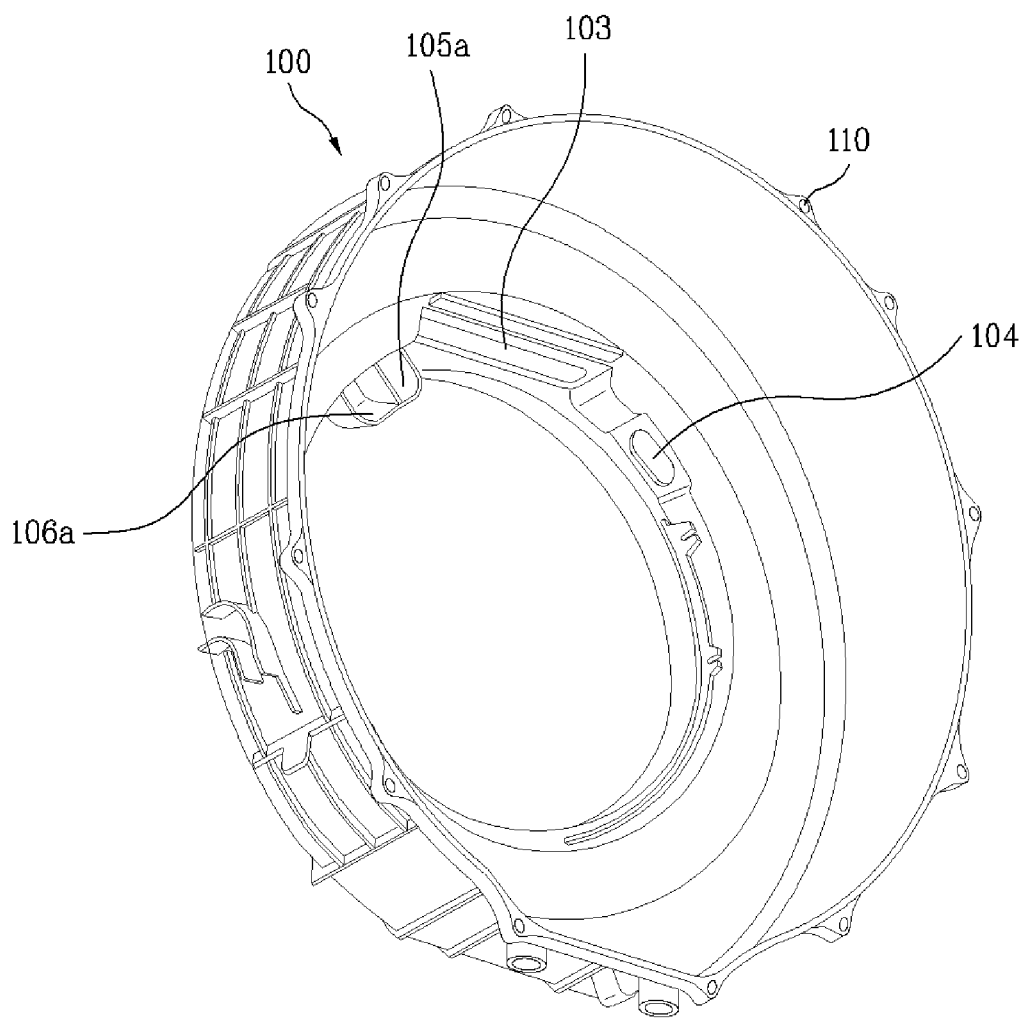

FIGS. 2 and 3 are diagrams illustrating the tub front 100. The tub front 100 includes a donut-shaped perpendicular front surface provided in a front portion of a cylindrical surface composing a predetermined portion of a side wall of the tub. A rear portion of the cylindrical surface is open as it is and the rear portion includes a plurality of securing holes 110 formed therein. The securing holes 110 are secured to corresponding securing holes (127, see FIG. 4) of the tub rear 120.

A rim part 101 is extended forward from an inner circumferential surface of the front surface of the tub front 100. The width of the rim part 101 is getting narrower downward from the top and substantially the rim part 101 may not be formed at a lower portion of an inner corner of the front surface.

In the rim part 101 may be formed a water supply inlet 104 configured to supply wash water, a hot air inlet 103 which will be used in a drying course, a circulating-water inlet 106 configured to drawn the wash water circulated by a circulation pump there through and a steam inlet 105 configured to draw steam there through.

Since the vibration of the tub 10 is noticeably reduced in the laundry machine according to the present invention, a water supply structure of a water supply hose, a drying structure of a drying duct and a steam supply structure, a circulating-water supply structure and the like may be implemented stably.

The hot air inlet 103 may be extended from the rim part 101 approximately in a square shape. Here, the hot air inlet 103 is required by a laundry machine having washing and drying functions and not by a laundry machine having no drying function.

The water supply inlet 104, the hot air inlet 103 and the like are formed in the front part of the tub front 100. Because of that, the supply of wash water, hot air and the like may be implemented in the front part of the tub 10.

The water supply inlet 104 and the other components may be located more forwardly than a front end of the drum 30 accommodated in the tub 10. As a result, the wash water, hot air and the like may be directly drawn into the drum 30 via the opening of the drum 30 configured to load the laundry therein or there out. Since fluidal material supplied to treat the laundry such as the wash water and hot air may be directly drawn into the drum 30 and this enables the laundry to be treated more efficiently.

In case detergent is supplied via a detergent box, together with the wash water, the detergent is directly drawn into the drum 30 and the amount of used detergent may be reduced accordingly, such that the amount of wash water may be reduced.

Here, a problem of tub contamination generated by detergent remnant loaded in a bottom of the tub may be solved. In case water is supplied from the front part of the tub, a door glass (not shown) may be washed by the supplied water advantageously.

Even if hot air is supplied via the front portion of the tub, a perpendicular surface of the tub front 100, that is, a front surface thereof, the hot air flow may be '⊂'-shaped, which is a complex air path formed by the hot air re-bent toward a perpendicular front surface of the tub after hot air having flown from the rear portion of the tub is bent downward from a front portion of a upper part of the tub. This '⊂'-shaped air path will not be helpful to efficient hot air flow. However, when the hot air inlet 103 is formed in the rim part 101 of the tub front 100, the hot air may be bent perpendicularly one time and it may flow smoothly.

The water supply inlet 104 and the other holes may be located beyond a center of the drum. Because of that, the wash water and the like may be supplied to the drum inside from a front upper portion of the drum. If it is necessary to supply the wash water and the like to the drum inside from a front lower portion of the drum, the rim part 101 of the tub front 100 may be formed in a lower portion of the front surface part 112. if it is necessary to supply the wash water and the like in a right and left direction, not in the upward and downward direction mentioned above, the rim part 101 may be formed in a inner corner center portion 131 of the front surface part 112. That is, the appearance of the rim part 101 may be variable according to which direction the supplied fluidal material is supplied along.

A coupling part 102 is formed in the rim part 101 to couple the foreign substance preventing material 200 to the tub front 100. The coupling part 102 is extended forward from the front end of the rim part 101, having a small cylindrical surface-like shape. Ribs 102a are formed in an outer circumferential surface of the small cylindrical surface.

Once the coupling part 102 is inserted in the foreign substance preventing part 200, the foreign substance preventing part 200 may be coupled to the coupling part 102. for that, inserting recesses (not shown) are formed in the foreign substance preventing material 200 and the small cylindrical surface having the ribs 102a formed therein is inserted in the inserting recess (not shown).

The tub front 100 is fixedly coupled to the cabinet front (not shown) and coupling bosses 107a, 107b, 107c and 107d are formed in the front surface of the tub front 100 for such the fixed coupling, approximately surrounding the rim part 101. After the cabinet front (not shown) is located in a state of the tub front 100 installed, screws are fastened backward to couple the tub front 100 to the cabinet front.

FIG. 3 is a rear view illustrating an inside of the tub front 100. The steam inlet 105 may be connected with a seam hose. A steam guide 105a is formed in the tub front 100 to guide steam drawn via the steam inlet 105 toward a drum inside and a circulating-water guide 106a is formed in the tub front 100 to guide circulating-water drawn via the circulating-water inlet 106 toward the drum inside. The steam inlet 105, the circulating-water inlet 106, the steam guide 105a, the circulating-water guide 106 and the like may be integrally formed with the tub front 100. The tub front 100 is plastic-injection-molded and the steam inlet 105 and the other components may be injection-molded as some parts of the tub front 100.

The tub front 100 is coupled to the tub rear 120 to form a predetermined space configured to accommodate the drum

30. Here, the tub front 100 and the tub rear 120 may be screw-fastened to each other. For this screw-fastening, a plurality of screw-securing holes 110 may be formed along a circumference of the rear part of the tub front 100.

Figure 4:
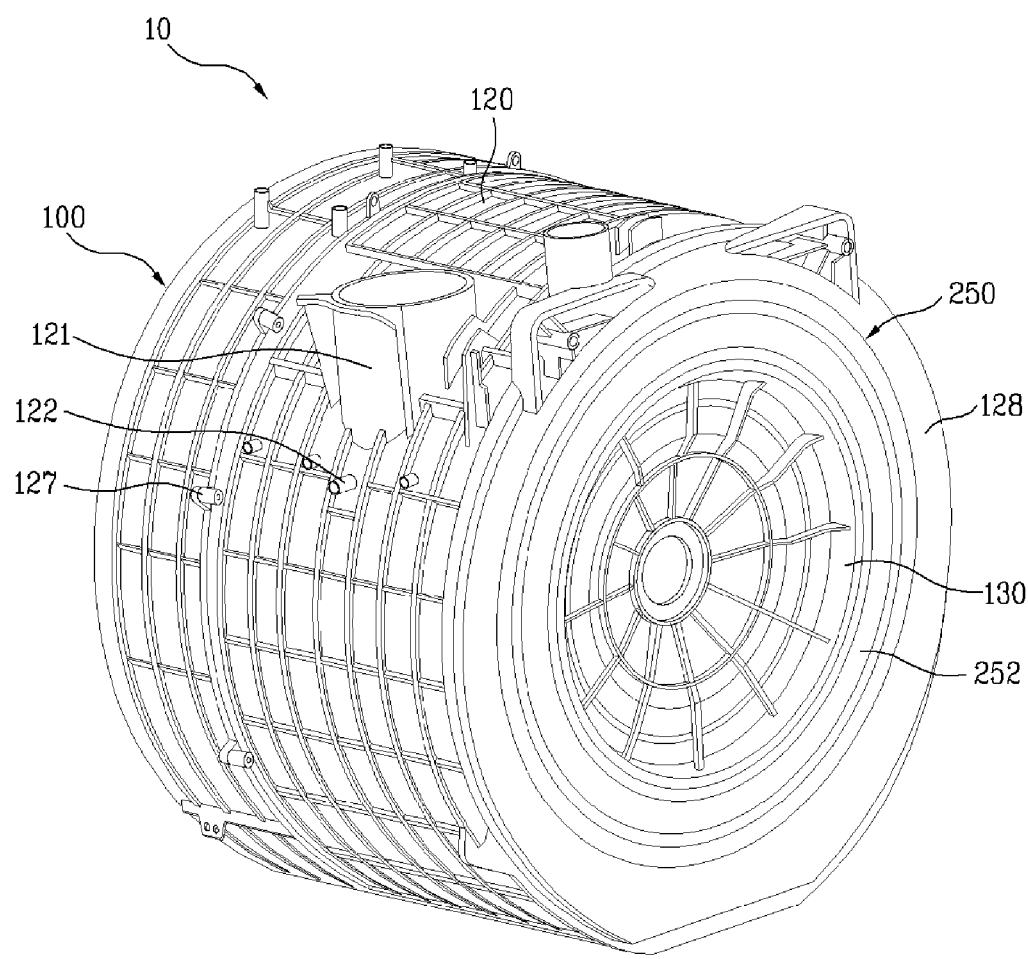
FIG. 4 is a rear perspective view illustrating a tub rear of the laundry machine.

FIG. 4 is a diagram illustrating the connection among the tub front 100, the tub rear 120, the tub back 130 and the rear gasket 250.

The tub rear 120 is cylindrical-shaped to surround the drum 30 and a front part of the tub rear is open and a rear part of the tub rear includes a donut-shaped rear surface 128. The front part is sealing-coupled to the tub front 100. A diameter of the rear surface 128 of the tub rear 120 is larger than an outer diameter of the tub back 130. Even when the tub back 130 is vibrated, the tub back 130 is distant from the tub rear 120 enough not to interfere with the rear surface 128 of the tub rear 120.

The rear gasket 250 is provided between the rear surface 128 of the tub rear 120 and the tub back 130. The rear gasket 250 seals the rear surface 128 of the tub rear 120 and the tub back 130 and it includes a corrugated part 252 flexible enough not to interfere with the vibration of the tub back 130.

A hot air inlet 121 is formed in a predetermined portion of the tub rear 120 in case of the laundry machine having washing and drying functions. In case of the laundry machine only having the washing function, the hot air outlet 121 may be not provided, of course.

A front supporting part 108 configured to fixedly support the tub with respect to the cabinet base 600 and a rear supporting part are further formed in lower parts of the tub rear 120 and the tub front 100 mentioned above, respectively.

Figure 5:
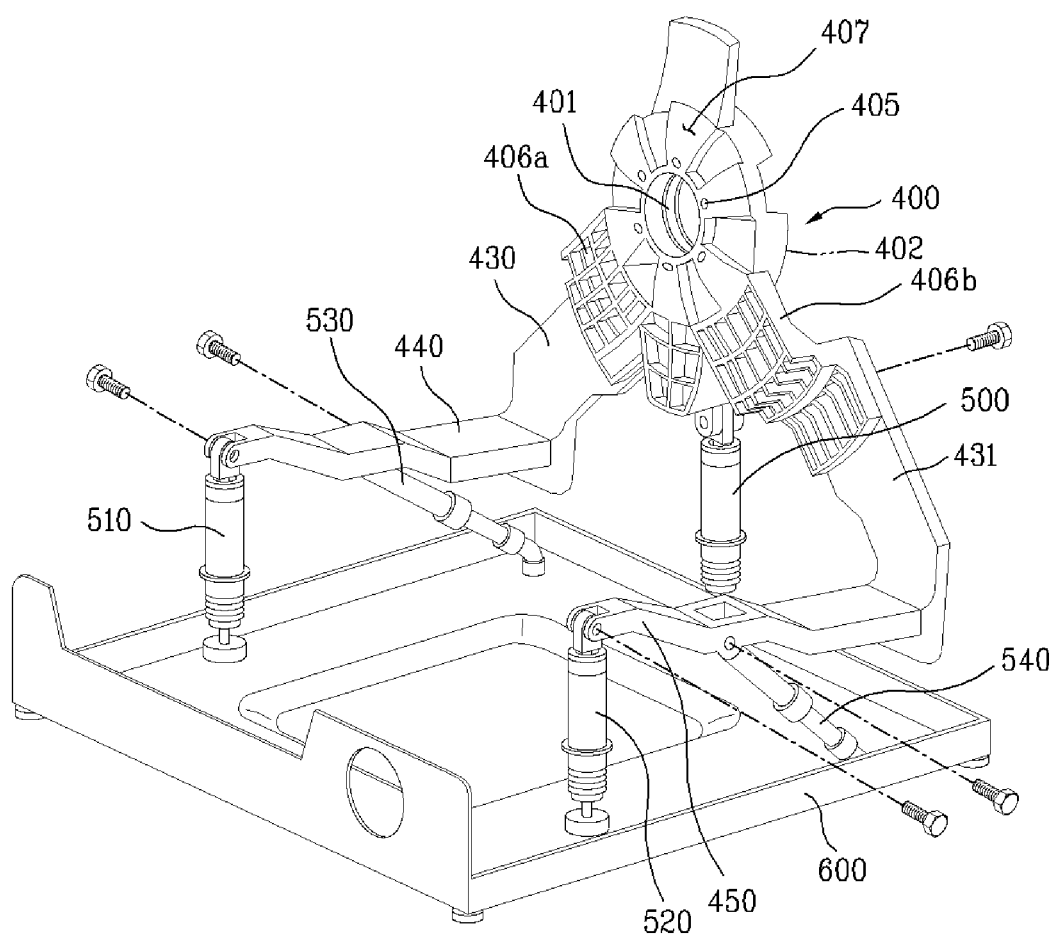
FIG. 5 is a perspective illustrating a suspension of the laundry machine.
Figure 6:
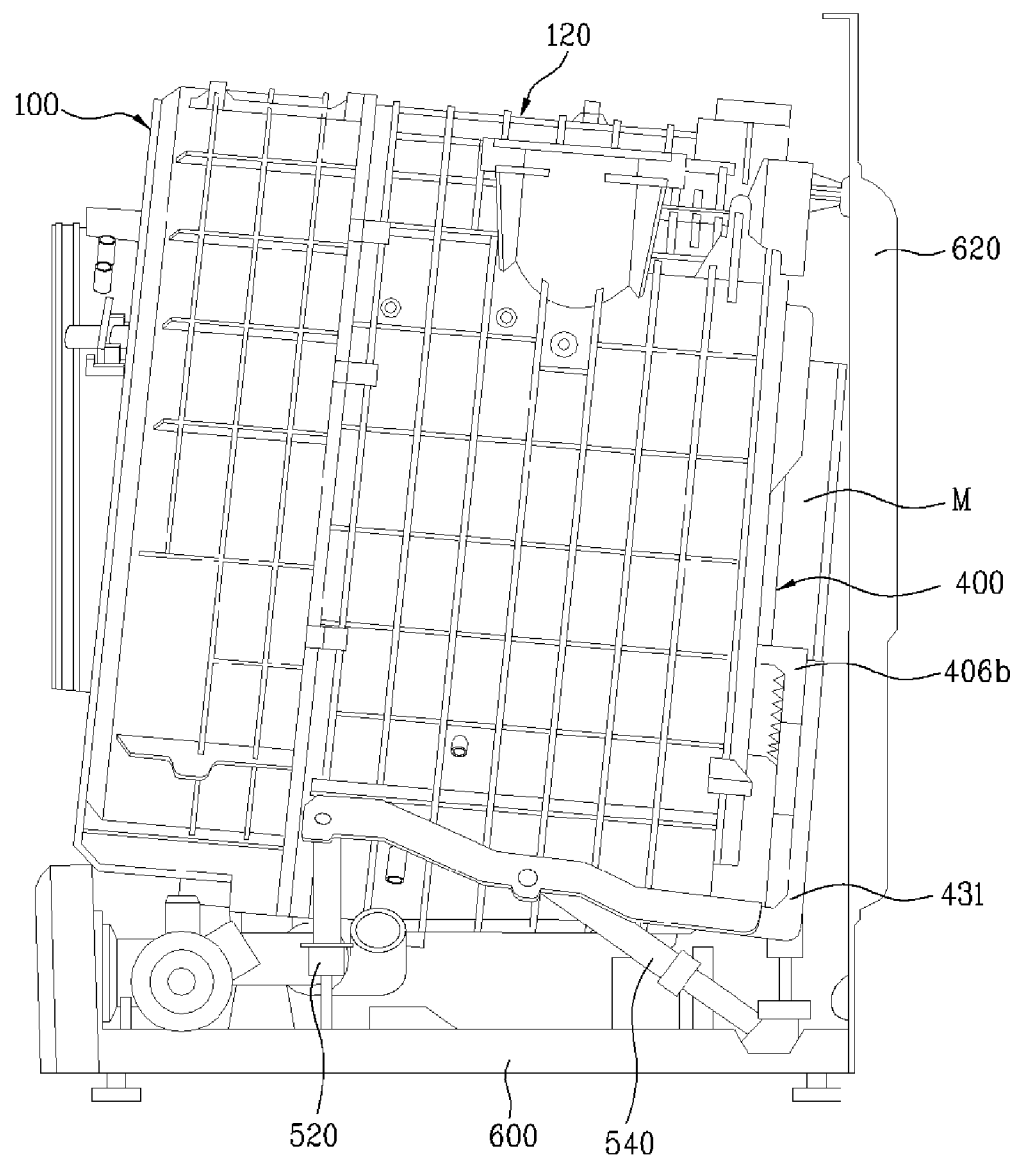
FIG. 6 is a side view illustrating a coupling state between the tub and the suspension provided in the laundry machine.

FIG. 5 is a diagram illustrating the suspension unit 40 mounted on the base 600. FIG. 6 illustrates a coupling state among the tub 100 and 120, the bearing housing 400 and the suspension unit 40.

The bearing housing 400 include a bearing supporting part 401 configured to support a bearing. A tub back securing part 407 configured to secure the tub back 250 thereto is formed in a front portion of the bearing housing 400 and a stator securing part 402 configured to secure the stator of the motor thereto is formed in a rear portion of the bearing housing 400.

Here, the suspension unit 40 includes a first oblique bracket 431, a second oblique bracket 430, a first suspension bracket 450 and a second suspension bracket 440.

The first suspension bracket 450 and the second suspension bracket 440 are extended in a forward and backward direction, that is, in an axial direction with respect to the rotation of the drum. In case they are extended in the axial direction, the first suspension bracket 450 and the second suspension bracket 440 may be called as axial brackets.

A first extending part 406*a* and a second extending part 406*b* extended from right and left side portions of the bearing housing 400 in a radius direction, respectively. The first oblique bracket 431 and the second oblique bracket 430 are connected to the first extending part 406*a* and the second extending part 406*b*, respectively. The first suspension bracket 450 and the second suspension bracket 440 are connected to the first oblique bracket 431 and the second oblique bracket 430, respectively.

Here, the shapes of the first extending part 406*a*, the first oblique bracket 431, and the first suspension bracket 450, the second extending part 406*b*, the second oblique bracket 430 and the second suspension bracket 440 are corresponding to each other. When the laundry is loaded in the drum, the first and second oblique brackets 431 and 430 are used to balance the center of gravity and they are used as mass in the vibration system of the drum.

The suspension unit 40 includes a first spring cylinder damper 520, a second spring cylinder damper 510 and a third spring cylinder damper 500 which are arranged vertically for the vertical suspension and a first cylinder damper 540 and a second cylinder damper 530 which are arranged obliquely for the backward suspension.

Here, a single one of the first spring cylinder damper 520, the second spring cylinder damper 510 and the third spring cylinder damper 500 may be arranged in a rear portion and the other two may be arranged in front right and left portions with respect to a center of the base 600. The first cylinder damper 540 and the second cylinder damper 530 may be arranged oblique forward and backward from rear right and left sides with respect to the center of the base 600, respectively.

Specifically, the first spring cylinder damper 520 is connected between the first suspension bracket 450 and the base 600. The second spring cylinder damper 510 is connected between the second suspension bracket 440 and the base 600. The third spring cylinder damper 500 is directly connected between the bearing housing 400 and the base 600.

The first cylinder damper 540 is obliquely installed between the first suspension bracket 450 and a rear portion of the base and the second cylinder damper 530 is obliquely installed between the second suspension bracket 440 and a rear portion of the base 600.

That is, the third spring cylinder damper 500 is arranged in a center of the rear portion and the first spring cylinder damper 520 and the second spring cylinder damper 510 are arranged in right and left sides of the rear portion. The first cylinder damper 540 and the second cylinder damper 530 are located on right and left sides of the third spring cylinder damper 500. That is, the spring cylinder dampers 500, 510 and 520 and the cylinder dampers 530 and 540 are vertically symmetrical.

As follows, a manufacturing method of the laundry machine having the above configuration will be described. Each of components which will be mentioned should be understood in reference to the above description and the drawings.

Figure 7:
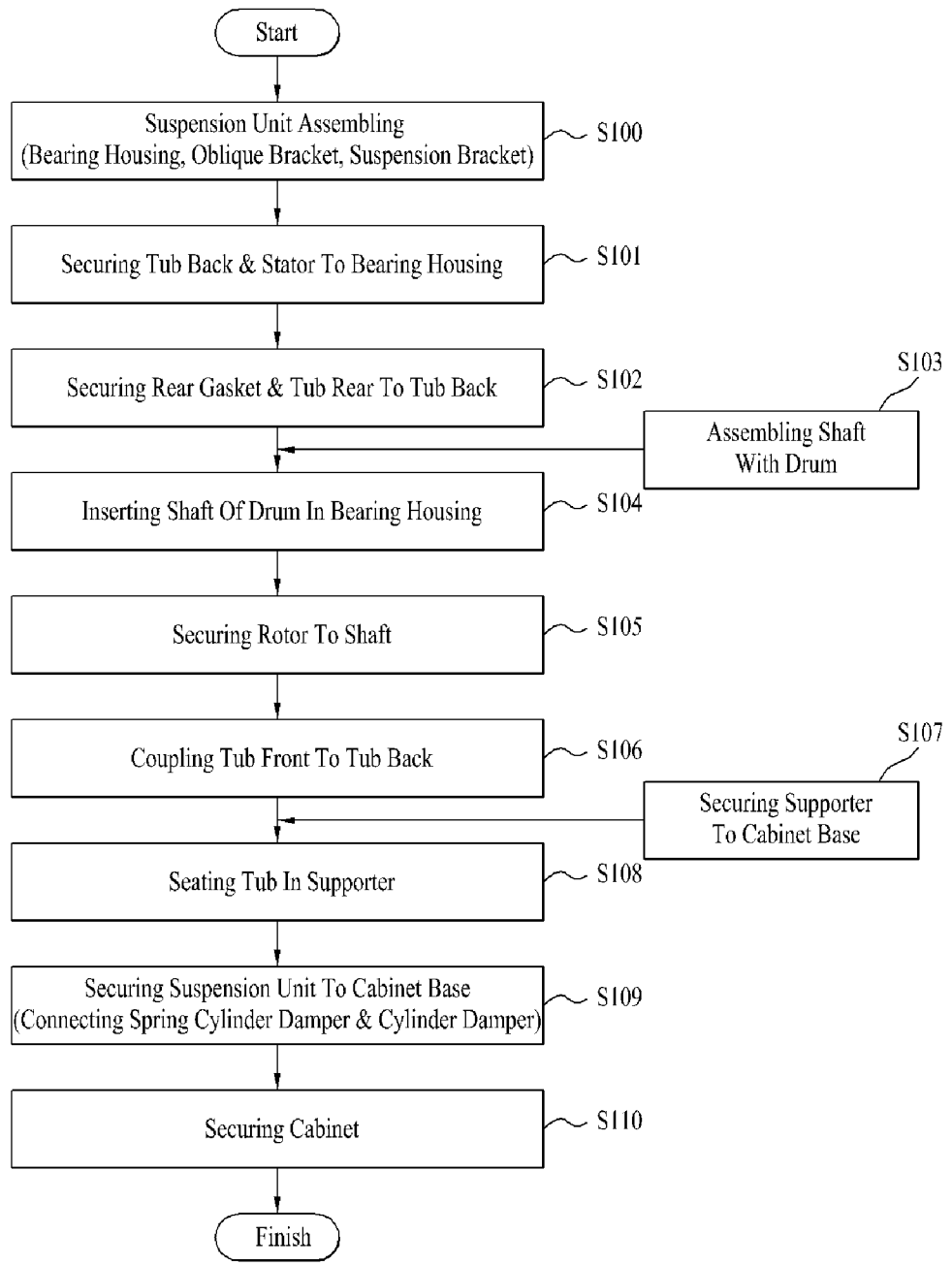
FIG. 7 is a controlling a manufacturing method of a laundry machine according to the present invention.
Figure 8:
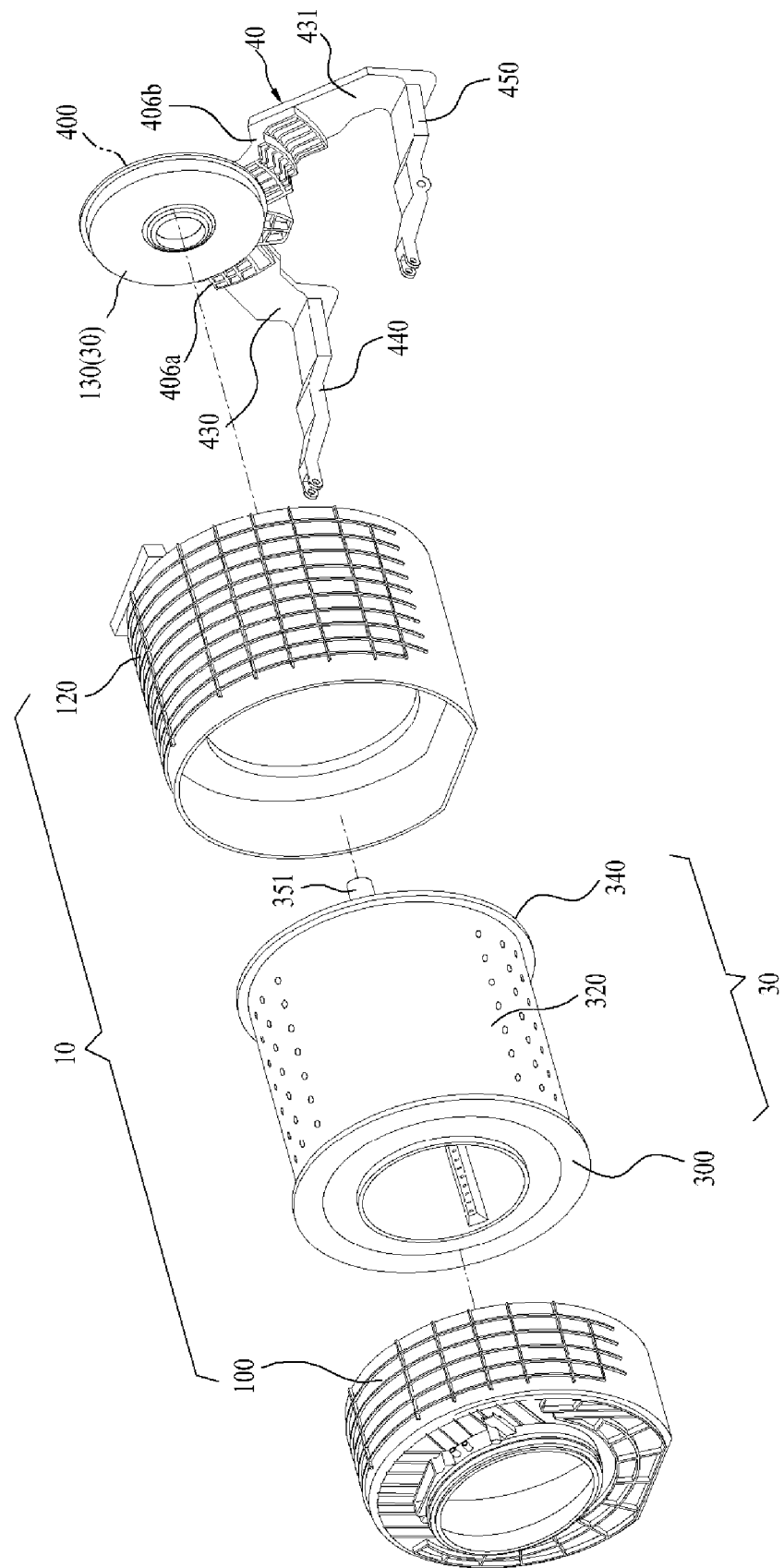
FIG. 8 is an exploded perspective view illustrating connection among a suspension unit, a drum and a tub.
Figure 9:
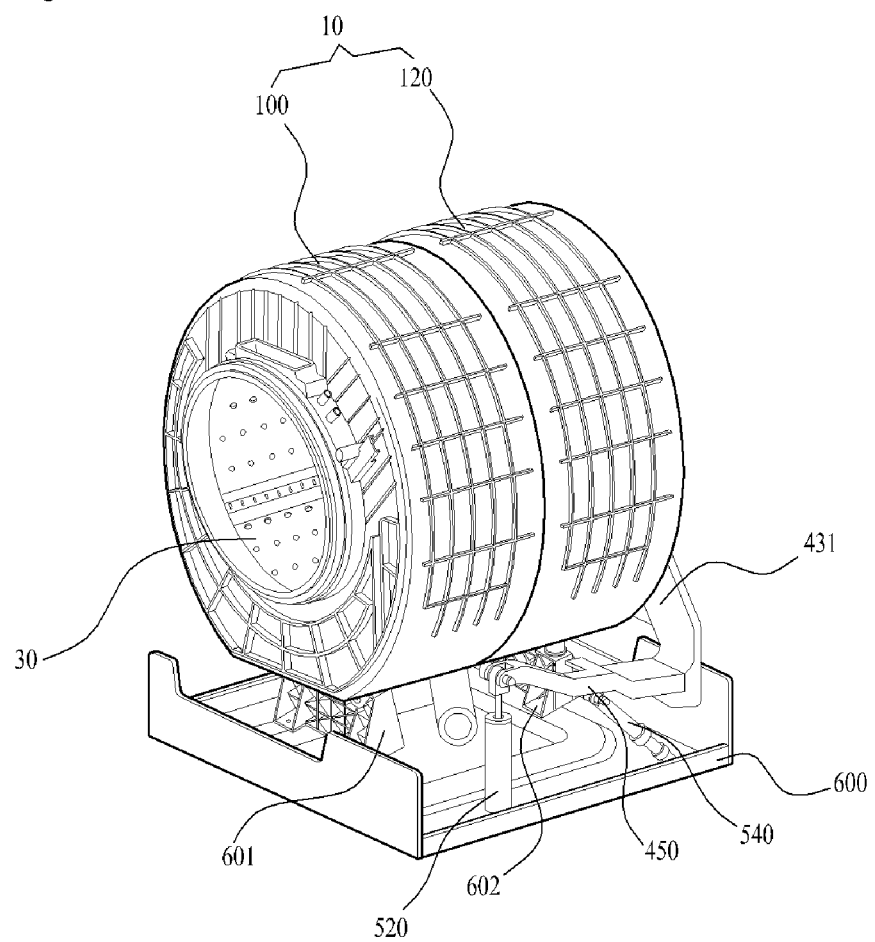
FIG. 9 is a perspective view illustrating a connection state between the suspension unit and a base.

FIG. 7 is a controlling a manufacturing method of a laundry machine according to the present invention. FIG. 8 is an exploded perspective view illustrating connection among a suspension unit, a drum and a tub. FIG. 9 is a perspective view illustrating a connection state between the suspension unit and a base.

As shown in FIGS. 7 and 8, the suspension unit 40 configured to support the drum is assembled according to the manufacturing method of the laundry machine. The suspension unit 40 includes the bearing housing 400, the first and second radial brackets 431 and 430 and the first and second suspension brackets 450 and 440 and they are assembled (S100).

Here, the first and second radial brackets 431 and 430 are coupled to the first and second extending parts 406*a* and 406*b*, respectively. The first and second extending parts 406*a* and 406*b* are extended from both right and left sides of the bearing housing in a radial direction. The first and second suspension brackets 450*a* and 450 are connected to the first and second radial brackets 431 and 430, respectively.

In the meanwhile, the first extending part 406, the first radial bracket 431 and the first suspension bracket 450 are formed symmetrical to each other with respect to the center of the bearing housing. Here, the assembled suspension unit 40 is supported by an auxiliary supporting structure (not shown).

Once the assembling of the suspension unit 40 is complete, the tub back 130 and the stator (not shown) may be connected with the bearing housing 400 of the suspension unit 40. Here, the tub back 130 is coupled to the front part of the bearing housing 400 and the stator of the motor is coupled to the rear part of the bearing housing 400 (S101).

The tub rear 120 is coupled to the tub back 130 connected with the suspension unit 40. At this time, the rear gasket 250 is coupled to the rear surface of the tub rear 120 coupled to the tub back 130, such that the rear gasket 250 may allow the tub rear 120 and the tub back 130 to relative-move with each other (S102). Here, the tub rear 120 coupled to the rear gasket 250 has no auxiliary supporting structure. Because of that, an auxiliary supporting structure (not shown) may support the tub rear 120 to prevent the tub rear 120 from being detached or falling down from the rear gasket 250 by the load of the tub rear 120.

In an auxiliary process rather than the processes mentioned above, the drum 30 and the shaft 351 are assembled. The drum is formed by the connection of the drum front 300, the drum center 320 and the drum back 340. Auxiliary ball balancers 310 and 330 may be installed in the drum front 300 and the drum back 340. In the assembling process of the shaft 351 and the drum 30, the spider 350 is installed in the drum back 340 and the shaft 351 is coupled to the center of the spider 350.

Hence, the shaft 351 connected to the drum 30 is inserted in the bearing supporting part 401 of the bearing housing 400 composing the suspension unit 40 assembled in the above process, to be rotatably connected to the bearing housing (S104).

The rotor (not shown) is secured to the shaft 351 of the drum 30, surrounding the stator secured to the bearing housing 400. Here, the rotor is coupled to the shaft 351 passing through the bearing housing 400 from an outer circumference of the stator secured to the bearing housing 400 and it rotates the shaft 351 and the drum 30 connected with the shaft 351 (S105).

Hence, the tub front 100 is coupled to the tub rear 120 supported to the bearing housing 400 by both of the tub back 130 and the rear gasket 250. the tub front 100 and the tub rear 120 are secured by the plurality of securing holes 110 formed in the tub front 100 and the plurality of securing holes 127 formed in the tub rear 120 (S106).

The tub rear 120 and the tub front 100 secured to each other are temporarily supported by an auxiliary supporting structure (not shown). That is, the rear part of the drum 30 located in the tub 10 is connected with the shaft 351 supported by the bearing housing 400 such that the drum 30 may be fixedly supported. However, the tub 10 has no auxiliary supporting structure and it happens to be moved downward by its weight. Because of that, the tub 10 might be collided against the drum 30 or fall down.

The cabinet base 600 is prepared in a separate process during the above processes. A supporter front 601 and a supporter rear 602 configured to support the drum 30 may be secured to the cabinet base 600 (S107, see FIG. 9).

Here, the supporter front 601 and the supporter rear 602 support the lower part of the tub installed in the laundry machine to support the tub 10 more rigidly with respect to the drum 30.

Hence, the tub is seated in the cabinet base 600 having the supporter front 601 and the supporter rear 602 secured thereto. At this time, a front supporting part 108 formed in the lower part of the tub front 100 and a rear supporting part (not shown) formed in the tub rear 120, which compose the tub 10, may be seated in the supporter front 601 and the supporter rear 602 by weights thereof, respectively, and auxiliary fastening members (not shown) (S108). These supporter front 601 and the supporter rear 602 may prevent the vibration of the tub 10 and the size of the tub 10 may be enlarged enough to be close to the cabinet 60 accordingly.

The tub can stand alone after being seated on the supporters 601 and 602. In other words, the supporters 601 and 602 support the tub in a way that no other means is necessary for the tub to stand on the base. Because of this stand-alone supporting, the manufacturing procedure can be more convenient and faster.

In the state of seating the tub 10 in the cabinet base 600, the suspension unit 40 is secured to the cabinet base 600. at this time, the first spring cylinder damper 520, the second spring cylinder damper 510, the first cylinder damper 540 and the second cylinder damper 530 are connected to lower parts of the first suspension bracket 450 and the second suspension bracket 440 of the suspension unit 40, such that the first suspension bracket 450 and the second suspension bracket 440 may be supported to be able to be vibrated. The third spring cylinder damper 500 is provided between a lower part of the bearing housing composing the suspension unit 40 and the cabinet base 600 (S109).

Lastly, the parts of the cabinet 60 configured to define the exterior appearance of the laundry machine are coupled to each other and the assembly process of the laundry machine is complete (S110).

According to the installation order of the parts composing the cabinet 60, a cabinet rear 620 is installed firstly. At this time, the cabinet rear 620 may be coupled to the tub rear 120 by an auxiliary securing member. After that, a cabinet left 640 and a cabinet right 630 are secured to the cabinet rear 620. Here, the cabinet left 640 and the cabinet right 630 may be installed to be close to both side surfaces of the tub, respectively. A vibration-isolating member (not shown) may be inserted between the cabinet left 640 and one of the side surfaces of the tub and between the cabinet right 630 and the other side surface.

Hence, a cabinet top (not shown) is installed in a top of the cabinet. Lastly, a cabinet front (not shown) is installed in a front of the cabinet. Here, the cabinet front is coupled to the coupling bosses 107a, 107b, 107c and 107d formed in the tub front 110 by predetermined coupling members.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A manufacturing method of a laundry machine comprising:
    installing a tub, a drum and a suspension unit to a cabinet base, the suspension unit being configured to suspend vibration of the chum, the tub being seated on a base by supporters, and having a rear portion, and a tub back, the suspension unit comprising a shaft, a bearing housing, and a bracket;
    then connecting a rear gasket between the rear portion of the tub and the tub back; and
    then assembling a cabinet front, a cabinet left, a cabinet right, and a cabinet rear to the cabinet base,
    wherein the tub is installed to stand alone on the base by the supporters in the step of installing the tub, the drum, and the suspension unit to the cabinet.

2. The manufacturing method as claimed in claim 1, wherein the tub and the drum are installed to the cabinet base such that suspensions, including the suspension unit, are installed to the base, in the step of installing the tub, the drum, and the suspension unit.

3. The manufacturing method as claimed in claim 1, wherein the tub back and the cabinet rear are fixed to each other.

4. The manufacturing method as claimed in claim 1, wherein the cabinet front is fixed to the base, and a front side of the tub and the cabinet front are fixed to each other.

5. The manufacturing method as claimed in claim 1, wherein the cabinet left and the cabinet right are fixed to the base so as to be adjacent to both sides of the tub.

6. The manufacturing method as claimed in claim 1, wherein each of the tub and the drum comprises an opening formed in a front part thereof to load laundry therein.

7. The manufacturing method as claimed in claim 1, wherein the tub is supported more rigidly with respect to vibration generated in the drum than the drum is supported.

* * * * *